Figure 13:
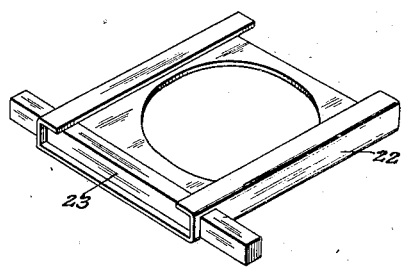

Feb. 17, 1942.                 J. M. BING                    2,273,430
                         MOUNT FOR OPTICAL DEVICES
                           Filed July 24, 1940              2 Sheets-Sheet 1
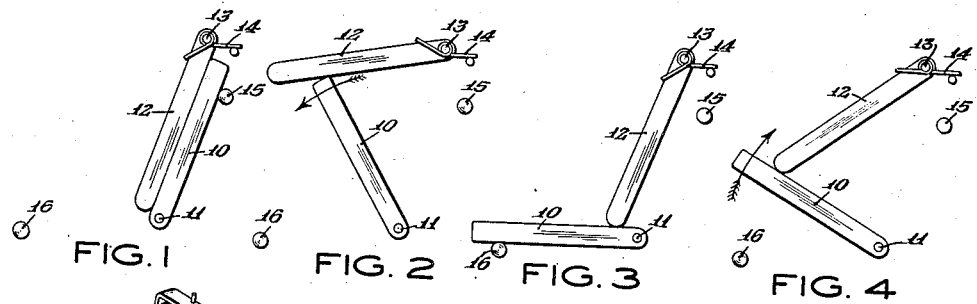
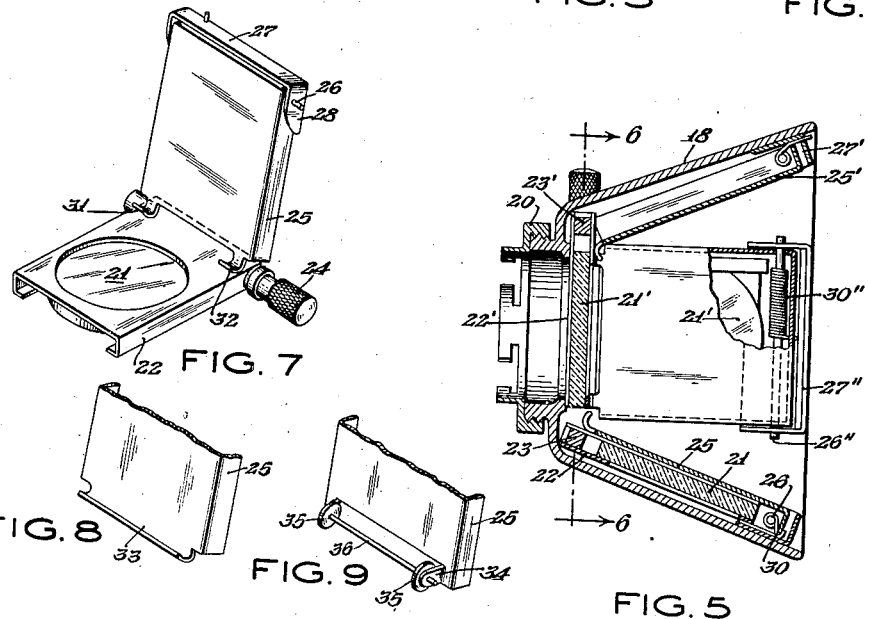
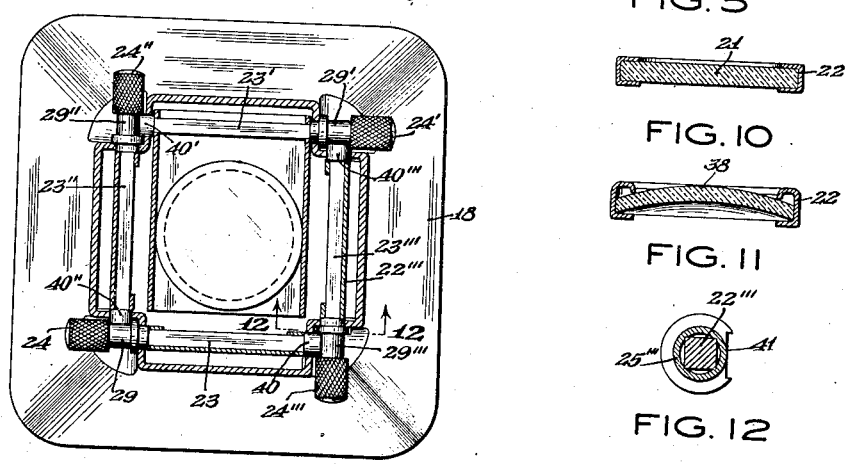
INVENTOR.
JOSEPH M. BING
BY
ATTORNEY.

Feb. 17, 1942.                J. M. BING                2,273,430
                       MOUNT FOR OPTICAL DEVICES
                        Filed July 24, 1940            2 Sheets-Sheet 2

INVENTOR.
JOSEPH M. BING
BY
  ATTORNEY.

Patented Feb. 17, 1942

2,273,430

UNITED STATES PATENT OFFICE 2,273,430

MOUNT FOR OPTICAL DEVICES

Joseph M. Bing, New York, N. Y.

Application July 24, 1940, Serial No. 347,262

12 Claims. (Cl. 95—81)

The present invention relates to a mount construction for optical devices such as filters, supplementary lenses, or the like, more particularly, though not limitatively, to devices of this type embodied in photographic apparatus, recording, illuminating and other optical devices such as cameras, projectors, enlargers, densitometric devices, spotlights, and the like.

Filters and supplementary lenses heretofore were either carried separately and provided with means for mounting the same in front of the lens of a camera, such as by a screw-on, slip-on or pivotal mount of known construction as is customary with photographic cameras, or by mounting a plurality of filters upon a suitable, rotatable or sliding support as is customary with projectors, projection printers and the like apparatus, in such a manner that a desired filter may be placed in the path of the light beam or bundle of the apparatus to obtain a desired effect.

In all the above cases, the lenses, filters, etc., when carried separately, either were not readily available when needed or an appreciable time was required for placing or mounting them in proper position, thus often losing valuable pictures in photography in case of transient or rapidly changing scenes or moving objects. The major drawback, however, and shortcoming in the previous practice of keeping and mounting optical filters which could not be overcome by fixedly securing the filters such as by a pivotal mount upon a camera or other optical apparatus, is the fact that in all the various mounting arrangements known in the prior art the filters or similar devices were more or less exposed when not in use and subject to become damaged by scratching, soiling or fingermarks when being placed in position resulting in serious consequences to the quality and sharpness of the image produced by a camera or projector or other optical apparatus and other defects well known to those skilled in the art.

Accordingly it is an object of the present invention to provide a novel mount for optical filters, supplementary lenses or the like, structurally embodied in an apparatus such as a lens shade, photographic camera etc. in such a manner that one or more filters or similar devices are normally, i. e. in the non-operative position, protected and concealed so as not to interfere, such as by causing light reflection, with the proper function of the apparatus, while capable of being moved into operative position from their resting place or position of concealment in a most simple and easy manner by the aid of a suitable operating element such as an adjusting knob, lever or the like.

Another object is to provide a selective mount for a plurality of optical filters, supplementary lenses or similar devices, or combinations of such devices structurally combined with a photographic or other optical apparatus, or an accessory device for such apparatus such as a lens shade for a photographic camera, whereby the filters are normally concealed and protected so as not to interfere, such as by causing reflecting effects, with the proper function of, or to obstruct the path of the light bundle passing through the apparatus, and may be instantly and selectively placed in operative position to suit any existing requirements.

In accordance with the above mentioned general objects it will become apparent, as the description proceeds, that the invention is susceptible of numerous uses and applications some of which are exemplified by the following embodiments taken singly or combined in any manner desired: the use of one or more contrast or color correction filters, such as yellow, green, red, blue filters, ultra-violet or haze filters, as commonly used in photography including both still and moving picture photography for compensating for the difference between the spectral sensitivity of the negative emulsion and the spectral response of the human eye; the employment of correction filters for Kodachrome or other color film to render film designed for daylight use suited under artificial illumination and vice versa; the use of neutral density filters to restrict the intensity of the light bundle passing through the lens of the camera or any other optical apparatus, or to obtain an image in monochrome on the screen of a reflex camera or in any other view finder representing the true tonal values as they will appear in the final black and white print; the employment of polarization filters used to reduce or eliminate glare or reflection effects; the provision of supplementary lenses to change the effective focal length of a photographic objective to obtain telephoto and wide-angle effects; the provision of color filters to be selectively placed in the path of the light bundle in a three-color camera or projection printer to produce blue, red, green and neutral color components into which a colored scene or object is decomposed and reconstructed therefrom in three-color photography; the use of color filters placed in the light path of a projection printer to compensate for certain spectral characteristics of the printing paper similar as in the case of color correction of the film or plate emulsion in a camera; the use of neutral density filters to serve as a light control means in place of an iris diaphragm; the provision of an orange or red filter placed in the path of the light bundle of a projection printer for adjusting and focusing purposes; the provision of a plurality of colored filters in combination with a still or moving picture projector or in general in any projecting device such as spot lights to obtain special color effects upon the projection screen, and many other uses and applications as will suggest themselves to those skilled in the art, as the following description proceeds.

Although the invention will be described in detail as exemplified in the form of a mount for one or more optical filters or supplementary lenses embodied directly in a photographic camera or a lens shade detachably or permanently mounted upon a camera, all the above mentioned and other uses and applications will at once become obvious in accordance with the underlying basic idea and spirit of the invention. In general, the invention may be embodied with equal advantage in any optical apparatus, wherein a light bundle passing through an enclosed chamber or channel is to be modified in one or more of its characteristics such as spectral composition (as in the case of color filters), intensity (as in the case of neutral density filters), refraction (as in the case of supplementary lenses), by the provision of one or more light modifying elements permanently structurally combined with such apparatus in such a manner that the filters or other modifying elements will be fully protected and concealed in the non-operative position in order not to interfere, such as by causing light reflections, with the proper function of the apparatus and may be selectively placed in operative position with respect to the light path to suit any existing requirements and to increase the versatility of the apparatus.

Accordingly in the following the term "filter" used for the purpose of this specification and in the claims appended hereto is to include all the above and similar optical modifying elements such as color filters, neutral density filters, haze filters, supplementary lenses or other devices serving to modify a characteristic such as the spectral composition, intensity, refraction or the like of a light beam or bundle for various purposes and to obtain specific effects and results.

Figure 14:
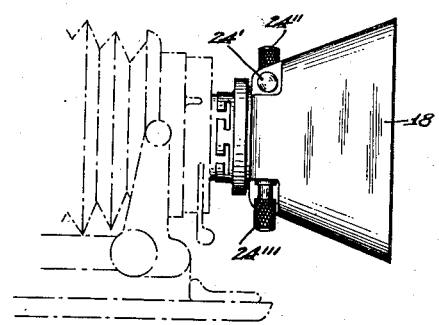
Figure 16:
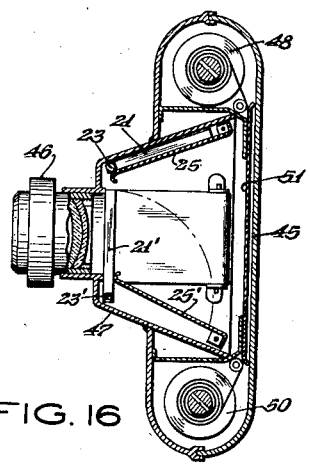
Figure 15:
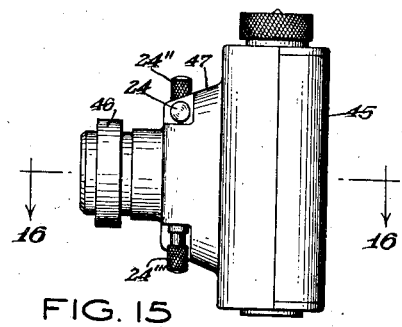
Figure 17:
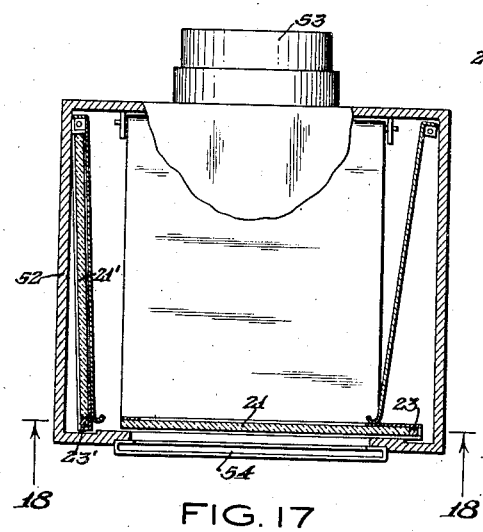
Figure 18:
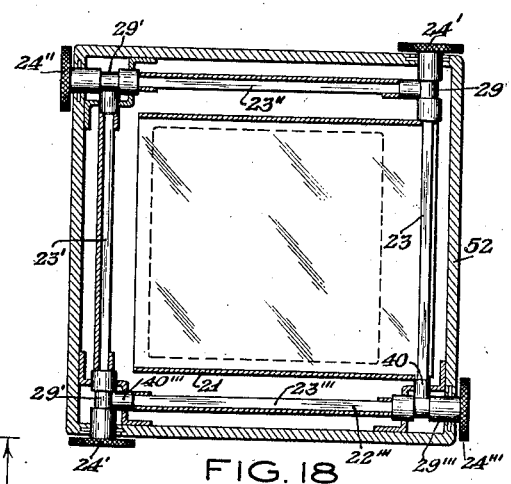

Further objects as well as advantages of the invention will become more apparent from the following detailed description taken in reference to the accompanying drawings forming part of this specification and wherein:

Figures 1 to 4 are schematic diagrams illustrating the principle and operation of the invention, Figure 5 is a vertical cross-sectional view through a multiple filter mount constructed in accordance with the invention structurally combined with a lens shade for photographic cameras, Figure 6 is a section taken on line 6—6 of Figure 5, Figure 7 is fractional isometric view of Figure 5 further illustrating the operation of the invention, Figures 8 and 9 are fractional views of Figure 7 illustrating modifications according to the invention, Figures 10 and 11 are fractional cross-sectional views illustrating further modifications of the invention, Figure 12 is a section taken on line 12—12 of Figure 6, Figure 13 is a further detailed isometric view showing the construction of the filter holder embodied in Figures 5 and 6, Figure 14 shows a combined filter and lens shade according to the invention attached to the lens mount of a camera, Figure 15 is a vertical cross-sectional view of a camera embodying a selective filter mount according to the invention, Figure 16 is a side view of the camera according to Figure 15, Figure 17 is a horizontal cross-section of a modified combined camera and selective filter mount according to the invention, and Figure 18 is a cross-sectional view taken on line 18—18 of Figure 17.

Like reference numerals identify like parts throughout the different views of the drawings.

With the afore-mentioned objects in view, the invention involves in general the provision of a support or holder for a filter, supplementary lens or the like hingedly connected to the wall of a lens shade or other light passage or chamber in a photographic or other optical apparatus so as to substantially lie against said wall in its non-operative position without obstructing the light passage through said apparatus. In order to prevent undesirable reflection and interference with the operation of the said apparatus on the one hand and to protect the filter against touching or scratching etc. on the other hand, there is further provided in accordance with the invention a non-reflecting shielding member or cover also hingedly connected to the wall of said lens shade or other light chamber so as to overlie and conceal the filter or equivalent device.

This cover may be held in place by any suitable force such as by gravity or advantageously by means of a spring, urging it against the filter, when the latter is in the non-operative position, in such a manner that the filter may be moved into operative position with respect to the light bundle passing through the lens shade or other apparatus and returned to its non-operative position or place of concealment substantially without obstruction by the said shield or cover in a manner as will become further apparent as the description proceeds.

Referring more particularly to Figures 1 to 4 of the drawings, there is shown schematically a filter or the like 10, covered or concealed by a shield or cover 12 in the non-operative position, Figure 1. The filter 10 which may be mounted in a suitable frame or holder is hinged at 11 and its non-operative and operative positions with respect to a light beam or bundle are fixed by a pair of stops or abutment members 15 and 16, respectively. The cover may be held and retained in the non-operative position shown in Figure 1 by gravity or preferably by spring action as in the example illustrated. To this end, the cover 12 is hinged at 13, that is at a point opposite to the pivot 11 for the filter 10, and is provided with a coil spring 14 arranged to urge the cover against the filter and to prevent the latter from turning and leaving its non-operative position.

If it is desired to turn the filter into its operative position with respect to a light bundle entering or passing through a photographic or other apparatus, the same is rotated by the aid of a suitable adjusting element such as a knob or lever about its axis in the direction of the arrow as shown in Figure 2, thereby lifting the cover 12 against the action of the spring 14. After the free edge of the filter has passed the free edge of the cover, the latter will return to its original position by virtue of the spring 14 which has been tensioned by the preceding movement, while the filter may be further moved to its operative position limited by the stop 16. In the latter position the filter will be held and prevented from dropping back by the cover 12 the lower edge of which will act as a locking or abutment element for the filter as seen more clearly from Figure 3.

In order to return the filter to its original or non-operative position the same is turned in the opposite direction as shown by the arrow in Figure 4, whereby the rounded free edge of the cover 12 will slide upon the filter or its frame, thereby again tensioning the spring 14. After the free edge of the cover has passed the free end of the filter, its movement will be reversed so as to follow the filter in the reverse direction until again reaching the original position as shown in Figure 1. The free edge of the cover 12 is suitably shaped or rounded to prevent jamming at the start of the return movement as will be further explained in the following.

Referring to Figures 5 and 6, there is shown an embodiment of the invention in the form of a lens shade widely used as an accessory for photographic cameras and usually placed in front of the camera lens for the avoidance of extraneous and stray light entering the lens and to secure other desirable effects. According to the invention, such a lens shade has a selective filter mount structurally embodied therein in the manner described in detail in the following. Item 18 represents the lens shade body, which, in the example shown, has the form of a truncated pyramid of square cross-section with four lateral walls and an open base and apex or inner boundary surface. The latter is provided with suitable means for attaching the lens shade to the lens mount of a camera such as by the provision of a screw-threaded cylindrical flange as shown, a bayonet catch arrangement or simply by a slip-on collar 20 of suitably resilient metal screwed on as shown in the drawings or otherwise suitably secured to the lens shade body. Permanently attached to the lens shade are one or more optical filters, shown at 21, 21′, 21″ and 21‴. The filters are mounted in suitable holders such as frames 22—22‴, respectively, the latter being in turn supported by shafts 23—23‴. The shafts are journaled in suitable openings through depressed portions in the lens shade body at the corners of the inner or apex opening serving as bearings for the shafts. In this manner all four filters in the example shown when not in use will lie against the inner surfaces of the lens shade walls and may be selectively moved or swung into operative position at right angle to the axis of the lens shade or light bundle entering the same by rotating the corresponding shafts by the aid of suitable operating elements such as levers or knurled knobs 24—24‴, respectively, provided in the example illustrated.

In order to keep the filters, when not in use, properly protected against scratches, dirt, fingermarks on the one hand and to prevent interference with the light bundle passing through the lens shade into the camera and by causing undesirable reflections on the other hand, the filters are protected and concealed by means of non-reflecting shields or cover members 25—25‴, also pivotally secured to the lens shade walls in such a manner as not to obstruct the movement of the filters from their non-operative positions to their operative positions and vice versa, the cooperation between the filters and cover members being substantially the same as shown and described in reference to Figures 1 to 4.

In the example shown, the cover members 25—25‴ are of tray shape, having side walls to effect a complete shielding and protection of the filters and are furthermore provided with shafts or extending studs 26 to 26‴ passed through holes in suitable brackets 27—27‴ secured to the outer edges of the lens shade walls. However, any other mounting arrangement for the filters and cover members may be resorted to differing from the details shown for purposes of illustration as will readily suggest themselves to those skilled in the art coming within the spirit of the invention.

The cover members 25—25‴ may normally be held in place and urged against the filters by gravity or any other suitable force and may be lifted and returned by hand when moving the filters to or returning them from their operative position as shown for the filter 21′ in Figure 5. Alternatively, the operation may be automatic by the provision of retaining springs such as coil springs 30—30‴ encircling the shafts 26—26‴ and having one end engaging the cover and having the other end engaging the lens shade body. In this manner the cover members are constantly urged against the filters in any position of the lens shade and will allow adjustment of the filters in a manner substantially as shown and described in reference to Figures 1 to 4. In order to prevent jamming at the start of the return movement the cover members 25—25‴ in the example shown are provided with suitably curved or trough-shaped extensions or lugs 31 and 32, Figure 7, or a single curved extension 33 may be provided shown in Figure 8. Alternatively a pair of rollers 35 may be provided for this purpose mounted upon a shaft 36 journaled in a pair of projecting lugs 34 of the cover members as shown in Figure 9.

The shafts 23—23‴ for the filter holders according to one modification as shown may be of square shape and passed through corresponding openings in the lateral walls of the mounting frames 22—22‴ as shown more clearly in Figure 13. Cylindrical sleeves 40—40‴ are placed over one end of the shafts 23—23‴ such as by forcing the sleeves over the shafts or in any other suitable manner, while further sleeves 29—29‴ are mounted at the opposite ends of the shafts 23—23‴ having attached thereto or being integral with the adjusting knobs 24—24‴ and having flanges to provide depressed portions or circular recesses together with the knobs 24—24‴ adapted to engage the sleeves 29—29‴ of the adjacent shafts in such a manner that all four shafts will interlock successively to form a complete self-contained mounting assembly. In assembling the shafts in the example illustrated, at first shaft 23 is passed through the corresponding holes in the lens shade walls, then shaft 23″ is similarly mounted in position with its sleeve 40″ engaging the circular recess of sleeve 29, whereupon shaft 23′ is passed through its respective bearing holes in the lens shade with its sleeve 40′ engaging the recess of 29″. The shaft 23''' the flange of which is cut out as shown at 41 in Figure 12 is passed through the respective mounting holes of the lens shade and thereafter turned by an angle, preferably 180°, to interlock the entire shaft assembly in a manner as will readily be understood. As pointed out, there may be provided in place of the filters 21 mounted in suitable frames or holders as shown in cross-section in Figure 10 any other light modifying elements held in a suitable support or frame such as supplementary lenses to be placed in front of a camera lens such as shown in Figure 11.

Referring to Figure 14 there is shown for the sake of further illustration a combined filter and lens shade arrangement as described attached to the lens mount of a photographic camera.

Referring to Figures 15 and 16 there is shown a selective filter mount according to the invention embodied in a photographic camera such as a camera of the miniature type chosen in the example illustrated. The camera shown comprises in a known manner a camera body or casing 45, a lens mount 46 connected with the casing through a frustro-pyramidal chamber 47 similar to the shape of the lens shade described hereinabove. The filters 21—21''', protective covers 25—25''' and all the remaining parts and elements are substantially the same and mounted for selective adjustment to their operative position in substantially the same manner as described hereinbefore, the only difference in the present modification being the fact that the filters are arranged behind the lens instead of in front of the lens as in the case of a lens shade shown in preceding exemplification.

Items 48 and 50 represent a pair of film spools or cassettes, 51 is a pressure plate to keep the film drawn from the supply spool to the take-up spool past the picture frame in a plane condition in a manner well known. Further details of the camera have been omitted inasmuch as they are immaterial for the understanding and outside the scope of the invention and in an effort to simplify the disclosure.

Referring to Figures 17 and 18, there is shown a further embodiment of a selective multiple filter mount according to the invention structurally embodied in a camera which may be of the box or reflex type as shown or of any other suitable construction such as a miniature camera as shown in Figures 15 and 16. According to this modification the filters 21—21''' are arranged to be placed directly in front of the image gate or picture frame within the camera adjacent to the plate or film positioned in the focal plane of the camera lens in a manner well known. Inasmuch as filters are light refracting devices, their arrangement at a point remote from the focal plane such as in front of the camera lens according to standard practice or behind the lens as shown in Figure 16 may result in distortion and other defects on the picture reproduced by the lens upon the film or plate, unless careful precautions are taken in employing high-grade optical glass as material for the filters and in accurately grinding the surfaces of the filters to be in exact parallelism. These difficulties and precautions which are reflected to a substantial extent in the price of the filters are completely eliminated by placing the filters directly in front of the picture frame or focal plane in the operative or use position and to conceal and protect the filters in the manner proposed by the invention in the non-operative position so as not to interfere, by causing light reflections or otherwise, with the light bundle entering the lens and passing to the film or plate in the camera.

Another advantage of arranging the filters as shown in Figures 17 and 18 is the fact that a single filter may be used for a plurality of interchangeable lenses especially in the case of a miniature camera where a separate filter is required in most cases for each lens, whereby the size of the filter especially for large aperture or high-speed lenses often exceeds the negative area, thus requiring unduly expensive filters. Thus, in case of miniature cameras of the Leica or Kine-Exakta type having a standard negative size of 24 x 36 mm. and being equipped with from ten to fifteen interchangeable lenses serving for the most varied special uses such as wide-angle, telephoto, high-speed, portrait photography and the like, the diameter of the filters required is of the order of from 30 mm. upward and it will be evident that a single filter provided in the case of the invention for all the lenses of the camera, whether of large or small aperture, will result in considerable economy, not considering the elimination of the inconvenience of keeping and carrying a large number of separate filters subject to damage and soiling, etc., avoided by the use of and inherent in the principle of the invention. Furthermore, the filter effect will be free from variations resulting from the different transmission characteristics of different lenses, if the filters are placed immediately before the picture frame in the manner proposed.

The camera shown in Figures 17 and 18 for the sake of illustration is of the box type such as an ordinary reflex camera comprising a casing 52, an objective or lens mount 53 and a plate or film-pack or cassette 54 detachably such as slidingly mounted at the rear of the camera casing in a manner well known. As is understood, the plate or film cassette may be replaced by a rollfilm arrangement of known construction. The remaining details such as shutter, reflex mirror etc. are not shown inasmuch as they do not form a part of the invention and in order not to unnecessarily burden the disclosure. The filters 21—21''' which may be less than four if desired, are mounted within the camera casing in substantially the same manner as shown and understood from the preceding illustrations.

The camera shown in Figures 17 and 18 is especially suited for color photography by providing a red, blue and green filter to be selectively placed in front of the plate or film in the camera in the manner described to obtain the three component negatives as is customary in three-color photography. A fourth filter may be provided for ordinary black and white photography such as a yellow, green or haze filter or the like. The shafts 23—23''' in Figures 15 to 18 for the filters carrying the adjusting knobs 24—24''' are suitably passed through bearing holes in the camera casing in a manner so as not to allow light to enter into the interior of the camera by providing suitable light traps in the form of flanges engaging correspondingly circular recesses in the bearing holes in the manner shown in the drawings.

In order to properly identify the filters in the lens shade or the camera the knobs 24—24''' are provided with suitable identification marks or other identifying means which may be removable such as in the form of small colored discs or plates corresponding to the colors of the respective filters and arranged to be detachably connected to the knobs 24—24'''.

While arrangements have been shown in the foregoing embodying four filters or equivalent devices, it is understood that provision may be made for any greater number by suitably designing the lens shade or other light passage having a polygonal cross-section to provide more than four walls.

It will be evident from the foregoing that the invention is not limited to the specific constructions and embodiments shown and described herein for illustration, but that the underlying basic principle and inventive idea are susceptible of numerous variations and modifications coming within the broader scope and spirit of the invention as defined in the appended claims. The specification and the drawings are accordingly to be regarded in an illustrative rather than in a limiting sense.

I claim:

1. In a device of the character described, a chamber for passing a light bundle, at least one optical filter having a holder hingedly secured to an inside wall of said chamber near one edge thereof so as to lie against said wall in the non-operative position and adapted to be swung to and from its operative position with respect to said light bundle, a non-reflecting cover member hingedly secured to said wall near the opposite edge thereof, the distance between the hinges of said holder and cover being slightly greater than the distances the holder and cover extend from their hinges, spring means arranged to urge said cover member against said filter in the non-operative position and to allow lifting of said cover member and return to its resting position by swinging said filter from its non-operative to its operative position and vice versa, the cover riding on one side of the filter holder when the holder is first swung towards its operative position and riding on the other side of the holder after the free edge of the holder has passed the free edge of the cover, the free end of said cover member forming an abutment to retain said filter in the operative position and being shaped to glide upon said filter holder at the initiation of a return movement of said filter from its operative to its non-operative position.

2. In a device of the character described, a chamber having a plurality of substantially flat walls for passing a light bundle, a plurality of optical filters each hingedly secured to one of said walls near one edge thereof so as to lie against said walls in the non-operative position and adapted to be selectively swung to and from an operative position with respect to said light bundle, a plurality of non-reflecting covers hingedly secured to said walls near the opposite edge thereof, the distance between the hinges of each coordinated filter and cover being slightly greater than the distances the filters and covers extend from their hinges, spring means arranged to urge said cover members against said filters in their non-operative position and to allow lifting and return of said cover members by swinging said filters from the non-operative to the operative position and vice versa, the covers riding on one side of the respective filters when the filters are first swung towards their operative position and riding on the other side of the filters after the free edges of the filters have passed the free edges of the covers, the free ends of said cover members forming an abutment to retain said filters in their operative position and being shaped to readily glide upon said filters at the initiation of the return movement of said filters from their operative to their non-operative position.

3. In a device of the character described, a frustro-pyramidal chamber having at least four lateral walls for passing a light bundle, a plurality of optical filters each hingedly secured to one of said walls near the apex side of said chamber so as to lie against said walls in the non-operative position and adapted to be selectively swung to and from an operative position with respect to said light bundle, non-reflecting covers hingedly secured to said walls near the opposite edges thereof, the distance between the hinges of each coordinated filter and cover being slightly greater than the distances the filters and covers extend from their hinges, spring means arranged to urge said cover members against said filters in the non-operative position and to allow lifting and return of said cover members when swinging said filters from their non-operative to their operative position and vice versa, the covers riding on one side of the respective filters when the filters are first swung towards their operative position and riding on the other side of the filters after the free edges of the filters have passed the free edges of the covers, the free ends of said cover members forming an abutment to retain said filters in their operative position and being shaped to readily glide upon said filters at the initiation of a return movement of said filters from their operative to their non-operative position.

4. A lens shade for photographic cameras comprising a frustro-pyramidal casing having an open base and apex and at least four lateral walls, at least one optical filter hingedly connected to an edge of said walls near the apex side of said casing so as to lie against said wall in the non-operative position and adapted to be swung into operative position substantially at right angle to the axis of said casing, a cover hingedly connected to said wall near the base of said casing, the distance between the hinges of said filter and cover being slightly greater than the distances the filter and the cover extend from their hinges, spring means arranged to urge said cover member against said filter in the non-operative position and to allow lifting and return of said cover member when swinging said filter from its non-operative to its operative position and vice versa, the cover riding on one side of the filter when the filter is first swung towards its operative position and riding on the other side of the filter after the free edge of the filter has passed the free edge of the cover, the free end of said cover member forming a stop to retain said filter in the operative position and being shaped to readily glide upon said filter at the initiation of a return movement of said filter from its operative to its non-operative position.

5. A lens shade for photographic cameras comprising a frustro-pyramidal casing having an open base and apex and at least four lateral walls, a plurality of optical filters each hingedly connected to an inside edge of said walls near the apex end of said casing so as to lie against said walls in the non-operative position and adapted to be swung into operative position substantially at right angle to the axis of said casing, a plurality of non-reflecting covers hingedly connected to said walls near the base of said casing, the distance between the hinges of each coordinated filter and cover being slightly greater than the distances the filters and covers extend from their hinges, spring means arranged to urge said cover members against said filters in the non-operative position of said filters and to allow lifting and return of said cover members when swinging said filters from their non-operative to their operative position and vice versa, the covers riding on one side of the respective filters when the filters are first swung towards their operative position and riding on the other side of the filters after the free edges of the filters have passed the free edges of the covers the free ends of said cover members forming a stop to retain said filters in their operative position and being curved to readily glide upon said filters at the initiation of a return movement of said filters from the operative to the non-operative position.

6. The combination with a photographic camera comprising a camera casing, a lens mount and a negative carrier including a picture frame operatively associated with said casing, of at least one optical filter hingedly secured to an inside wall of said casing near the lens side of said casing so as to lie against said wall in the non-operative position and adapted to be swung into operative position in front of said picture frame, adjusting means operable from the outside of said casing to move said filter from its non-operative position to its operative position and vice versa, a non-reflecting cover hingedly connected with said wall, the distance between the hinges of said filter and cover being slightly greater than the distances the filter and the cover extend from their hinges, and spring means arranged to urge said member against said filter so as to conceal said filter in its non-operative position and adapted to swing about its pivotal axis so as not to obstruct the movement of such filter to and from its operative position, the cover riding on one side of said filter when the filter is first swung towards its operative position and riding on the other side of said filter after the free edge of the filter has passed the free edge of the cover.

7. The combination with a photographic camera comprising a camera casing, a lens and a negative carrier including a picture frame operatively associated with said casing, of a plurality of filters hingedly connected to the inside walls of said casing near the objective side of said casing so as to lie against said walls in the non-operative position and adapted to be swung to operative position in front of said picture frame, adjusting means operable from the outside of said casing for selectively moving said filters from their non-operative to their operative position, covers hingedly secured to said walls, the distance between the hinges of each coordinated filter and cover being slightly greater than the distances the filters and covers extend from their hinges, and spring means arranged to urge said cover members against said filters to conceal said filters in the non-operative position and adapted to swing about their pivotal axes so as not to obstruct the movement of said filters to and from their operative positions, the covers riding on one side of the respective filters when the filters are first swung towards their operative position and riding on the other side of the filters after the free edges of the filters have passed the free edges of the covers.

8. In combination with a photographic camera comprising a camera casing, a lens and a negative carrier including a picture frame operatively associated with said casing, a frustro-pyramidal chamber connecting said lens with said picture frame with said picture frame arranged at the apex of said chamber, a plurality of optical filters hingedly connected to the inside walls of said chamber at the side of said picture frame so as to lie against said walls in the non-operative position and adapted to be swung into operative position in front of said picture frame, adjusting means operable from the outside of said casing for moving said filters from their non-operative position to their operative position, a plurality of non-reflecting covers hingedly connected to said walls, the distance between the hinges of each coordinated filter and cover being slightly greater than the distances the filters and covers extend from their hinges, and spring means to urge said cover members against said filters to conceal said filters in their non-operative position and adapted to be swung about their pivotal axes so as not to obstruct the movement of said filters to and from their operative positions, the covers riding on one side of the respective filters when the filters are first swung towards their operative position and riding on the other side of the filters after the free edges of the filters have passed the free edges of the covers.

9. The combination with a photographic camera comprising a camera casing, a lens mount and a negative carrier operatively associated with said casing, of at least one optical filter hingedly secured to an inside wall of said casing near the lens side of said casing so as to lie against said wall in the non-operative position and adapted to be swung into operative position closely behind said lens mount, adjusting means operable from the outside of said casing to move said filter from its non-operative position to its operative position and vice versa, a non-reflecting cover hingedly connected with said wall, the distance between the hinges of said filter and cover being slightly greater than the distances the filter and the cover extend from their hinges, and spring means arranged to urge said member against said filter so as to conceal said filter in its non-operative position and adapted to swing about its pivotal axis so as not to obstruct the movement of such filter to and from its operative position, the cover riding on one side of the filter when the filter is first swung towards its operative position and riding on the other side of the filter after the free edge of the filter has passed the free edge of the cover.

10. The combination with a photographic camera comprising a camera casing, a lens and a negative carrier operatively associated with said casing, of a plurality of filters hingedly connected to the inside walls of said casing near the objective side of said casing so as to lie against said walls in the non-operative position and adapted to be swung to operative position closely behind said lens, adjusting means operable from the outside of said casing for selectively moving said filters from their non-operative to their operative position, covers hingedly secured to said walls, the distance between the hinges of each coordinated filter and cover being slightly greater than the distances the filters and covers extend from their hinges, and spring means arranged to urge said cover members against said filters to conceal said filters in the non-operative position and adapted to swing about their pivotal axes so as not to obstruct the movement of said filters to and from their operative positions, the covers riding on one side of the respective filters when the filters are first swung towards their operative position and riding on the other side of the filters after the free edges of the filters have passed the free edges of the covers.

11. In a device of the character described, a chamber for passing a light bundle, at least one light modifying element having a holder hingedly secured to an inside wall of said chamber near one edge thereof so as to lie against said wall in the non-use position and adapted to be swung to and from its operative position with respect to said light bundle, a non-reflecting cover for said element hingedly secured to said wall near the opposite edge thereof, the distance between the hinges of said holder and cover being slightly greater than the distances the holder and the cover extend from their hinges, spring means arranged to urge said cover toward said wall to allow lifting of said cover and return to its resting position by swinging said holder from its non-use position to its operative position and vice versa, the cover riding on one side of the holder when the holder is first swung towards its operative position and riding on the other side of the holder after the free edge of the holder has passed the free edge of the cover, and the free end of said cover forming an abutment to retain said holder in the operative position and being shaped to glide upon said holder at the initiation of a return movement of said holder from its operative to its non-use position.

12. In a device of the character described, a chamber having a plurality of substantially flat walls for passing a light bundle, a plurality of light modifying elements having holders each hingedly secured to one of said walls near one edge thereof so as to lie against said walls in the non-use position and adapted to be selectively swung to and from an operative position with respect to said light bundle, a plurality of non-reflecting covers for said elements hingedly secured to said walls near the opposite edges thereof, the distance between the hinges of each coordinated holder and cover being slightly greater than the distances the holders and covers extend from their hinges, spring means arranged to urge said cover members toward said walls to allow lifting and return of said covers by swinging said holders from their non-use to their operative positions and vice versa, the covers riding on one side of the respective holders when the holders are first swung towards their operative position and riding on the other side of the holders after the free edges of the holders have passed the free edges of the covers, the free ends of said covers forming abutments to retain said holders in their operative position and being shaped to readily glide upon said holders at the initiation of the return movement of said holders from their operative to their non-use position.

JOSEPH M. BING.